(12) United States Patent
Jaiswal et al.

(10) Patent No.: US 8,180,646 B2
(45) Date of Patent: May 15, 2012

(54) SYSTEM AND METHOD FOR IMPLEMENTING VOICE PRINT-BASED PRIORITY CALL ROUTING

(75) Inventors: Peeyush Jaiswal, Boca Raton, FL (US); Naveen Narayan, Flower Mound, TX (US); Fang Wang, Plano, TX (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 11/762,493

(22) Filed: Jun. 13, 2007

(65) Prior Publication Data

US 2008/0312925 A1    Dec. 18, 2008

(51) Int. Cl.
*G10L 17/00* (2006.01)
*H04M 1/64* (2006.01)

(52) U.S. Cl. .................. 704/273; 379/88.02; 379/88.21; 704/246; 704/270.1

(58) Field of Classification Search .................. 704/246, 704/270, 270.1, 273; 379/88.02, 88.21
See application file for complete search history.

(56) References Cited

U.S. PATENT DOCUMENTS

| 6,044,146 A * | 3/2000 | Gisby et al. ............. 379/266.02 |
| 2003/0169857 A1 | 9/2003 | Akhteruzzaman et al. |
| 2003/0233231 A1 | 12/2003 | Fellenstein et al. |
| 2004/0058710 A1 * | 3/2004 | Timmins et al. ............. 455/560 |
| 2004/0190688 A1 * | 9/2004 | Timmins et al. ........... 379/88.02 |
| 2005/0047560 A1 * | 3/2005 | Mostad ...................... 379/88.19 |
| 2006/0078098 A1 | 4/2006 | Sereboff |
| 2006/0188076 A1 * | 8/2006 | Isenberg .................... 379/88.02 |

* cited by examiner

*Primary Examiner* — Abul Azad
(74) *Attorney, Agent, or Firm* — Yudell Isidore Ng Russell PLLC

(57) ABSTRACT

A system, method, and computer-usable medium for routing a call. A server receives a call from a client. A routing engine captures a voice print from the call. In response to the routing engine capturing the voice print from the call, the routing engine compares the voice print to a database that includes a collection of voice prints. In response to the routing engine matching the voice print to at least one voice print among the collection of voice prints, an interactive voice response (IVR) module routes the call to an appropriate call queue based on the matching of the voice print. The appropriate queue routes the call from the appropriate call queue to a call center corresponding to the appropriate call queue.

12 Claims, 4 Drawing Sheets

SYSTEM AND METHOD FOR IMPLEMENTING VOICE PRINT-BASED PRIORITY CALL ROUTING

BACKGROUND OF THE INVENTION

1. Technical Field

The present invention relates in general to the field of data processing systems and more particularly, to processing data on data processing systems. Still more particularly, the present invention relates to the field of categorizing and organizing data for more efficient processing on data processing systems.

2. Description of the Related Art

Modern businesses often employ call centers to handle large volumes of calls. Frequently, these businesses also employ computers that provide automated responses to callers with frequently asked questions to reduce the number of necessary operators at call centers.

SUMMARY OF THE INVENTION

The present invention includes a system, method, and computer-usable medium for routing a call. A server receives a call from a client. A routing engine captures a voice print from the call. In response to the routing engine capturing the voice print from the call, the routing engine compares the voice print to a database that includes a collection of voice prints. In response to the routing engine matching the voice print to at least one voice print among the collection of voice prints, an interactive voice response (IVR) module routes the call to an appropriate call queue based on the matching of the voice print. The appropriate queue routes the call from the appropriate call queue to a call center corresponding to the appropriate call queue.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF AN ILLUSTRATIVE EMBODIMENT

Figure 1A:
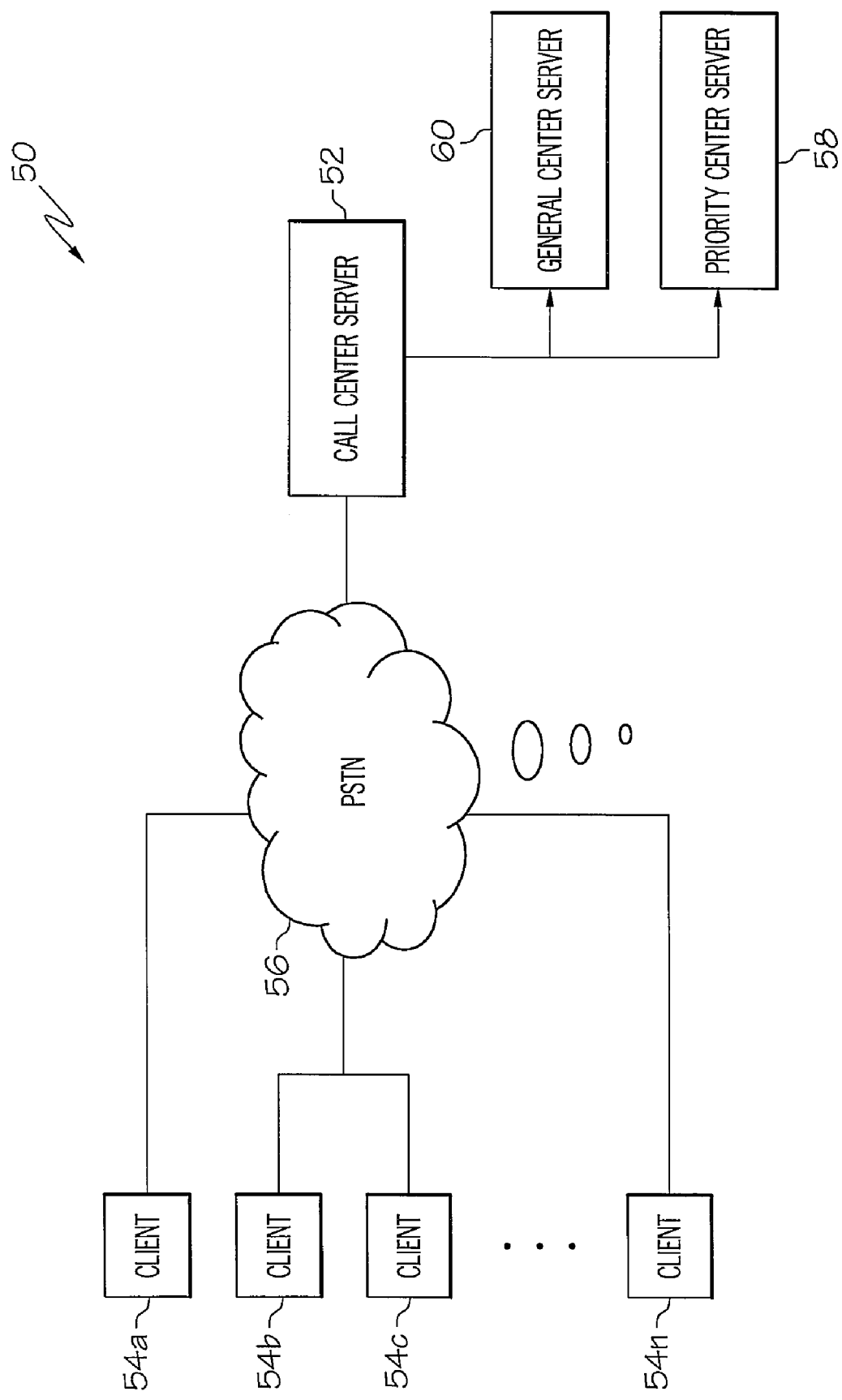
FIG. 1A illustrates an exemplary network in which an embodiment of the present invention may be implemented.

Referring now to the figures, and in particular, referring to FIG. 1A, there is illustrated an exemplary network 50 in which an embodiment of the present invention may be implemented. As illustrated, exemplary network 50 includes a call center server 52, a collection of clients 54a-54n, a public-switched telephone network (PSTN) 56, priority call center 58, and general call center 60. Call center server 52 enables an organization to field and prioritize incoming calls from clients 54a-54n and forward the calls to priority call center 58 and general call center 60. Clients 54a-54n may be implemented as land-based telephones, mobile (cellular) phones, or any other type of communications device. Those with skill in the art will appreciate that PSTN 56 may also be implemented with a wide-area network (WAN) such as the Internet and voice-over-IP (VoIP), a local-area network (LAN), IEEE 802.11x, or any other type of network.

According to an embodiment of the present invention, priority call center 58 and general call center 60 may be offices staffed with customer service representatives. Priority call center 58 is staffed with more experienced customer service representatives that are more equipped to deal with favored customers. General call center 60 is staffed with less experienced customer service representatives that are adequate for regular priority customer calls.

Figure 1B:
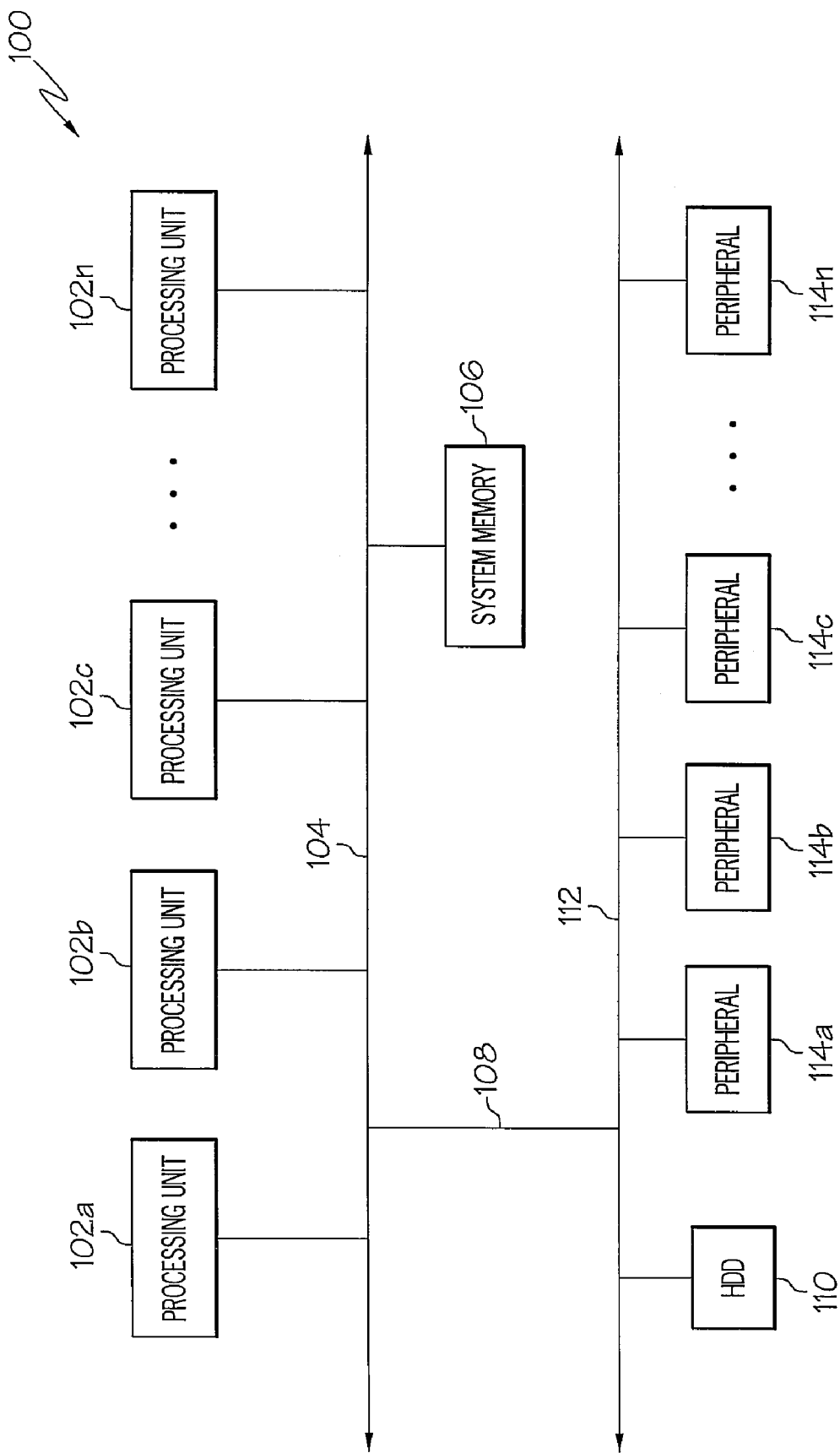
FIG. 1B depicts an exemplary data processing system in which an embodiment of the present invention may be implemented.

With reference to FIG. 1B, there is illustrated an exemplary data processing system 100, which may be utilized to implement call center server 52 and clients 54a-54n of network 50 as shown in FIG. 1. As illustrated, data processing system 100 includes a collections of processing units 102a-n, which are coupled to system memory 106 via a system interconnect 104. System interconnect 104 is coupled to peripheral interconnect 112 via mezzanine interconnect 108. Those with skill in the art will appreciate that peripheral interconnect 112 may be implemented by any type of interconnect including, but not limited to: peripheral component interconnect (PCI) bus, advanced graphics port (AGP), small computer system interface (SCSI), etc. Coupled to peripheral interconnect 112 is a hard disk drive 110 for mass storage and a collection of peripherals 114a-114n, which may include, but are not limited to: optical drives, other hard disk drives, printers, input devices, etc.

Those with skill in the art will appreciate that data processing system 100 can include many additional components not specifically illustrated in FIG. 1B. Because such additional components are not necessary for an understanding of the present invention, they are not illustrated in FIG. 1B or discussed further herein. It should be understood, however, that the enhancements to data processing system 100 provided by the present invention are applicable to data processing systems of any system architecture and are in no way limited to the generalized multi-processor architecture or symmetric multi-processing (SMP) architecture illustrated in FIG. 1B.

Figure 2:
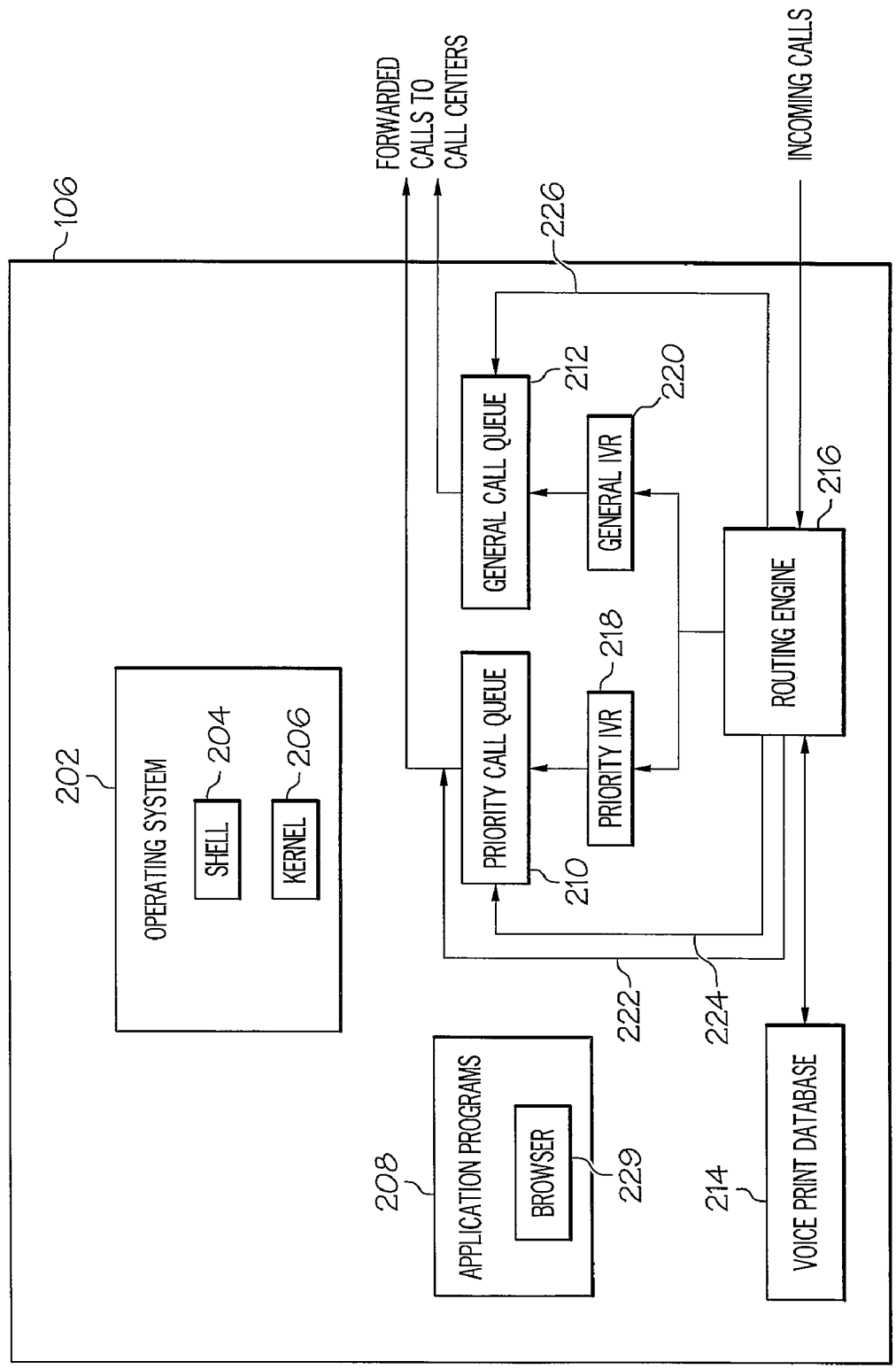
FIG. 2 shows an exemplary system memory of a call center server as depicted in FIG. 1A, in accordance with an embodiment of the present invention.

FIG. 2 is a block diagram illustrating exemplary contents of system memory 106 of call center server 52 (FIG. 1A), according to an embodiment of the present invention. As shown, system memory 106 includes operating system 202, which further includes shell 204 for providing transparent user access to resources such as application programs 208. Generally, shell 204 is a program that provides an interpreter and an interface between the user and the operating system. More specifically, shell 204 (as it is called in UNIX®) executes commands that are entered into a command line user interface or a file. Thus, shell 204, also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., kernel 206) for processing. Note that while shell 204 is a text-based, line-oriented user interface, the present invention will support other user interface modes, such as graphical, voice, gestural, etc. equally well.

As illustrated, operating system 202 also includes kernel 206, which includes lower levels of functionality for operating system 202 and application programs 208, including memory management, process and task management, disk management, and mouse and keyboard management. Application programs 208 can include a browser 229, utilized for access to Internet 56, word processors, spreadsheets, and other application programs. Also, system memory 106 includes priority call queue 210, general call queue 212, voice print database 214, routing engine 216, priority interactive voice response (IVR) module 218, and general IVR module 220.

According to an embodiment of the present invention, routing engine 216 receives incoming calls from clients 54a-54n (FIG. 1A). Upon receipt of a call from a client (e.g., client 54a), routing engine 216 captures a voice print of the call. Routing engine 216 compares the voice print to the collection of voice prints in the voice print database 214. The entries in the voice print database include, but are not limited to, a voice print, indicators of "priority" or "general" status, data utilized to identify the caller in the voice print such as, but not limited to: name, address, social security number, any other identifiers, and the like. In another embodiment of the present invention, the entries may also include an indicator of whether or not a priority caller should be routed directly to the call center (e.g., a "priority direct" caller), thus bypassing priority IVR 218 and priority call queue 210 altogether via path 222 and proceeding directly to priority call center 58. Depending on the content of the entries in the voice print database, routing engine 216 may also bypass the priority IVR 218 and general IVR 220 via paths 224 and 226.

If there is a match, routing engine 216 accesses matching corresponding entry in voice print database 214 and sends the call to the appropriate Interactive Voice Response (IVR) module (e.g., priority IVR module 218 or general IVR module 220) for IVR treatment. Routing engine 216 routes the call by accessing the entry associated with the matching voice print and making a determination if the caller is a priority or a general caller.

According to an embodiment of the present invention, priority IVR module 218 and general IVR module 220 enable a computer to detect voice or touch tone input over a telephone call. The computer responds to the input (voice and/or touch tone) with pre-recorded queries and/or information or dynamically-generated queries and/or information. The computer enables the caller to obtain or enter information into the system without the need for a human operator.

Once the call completes IVR treatment, the IVR modules routes the call into an appropriate queue. Priority IVR module 218 sends the call to a priority call queue 210 and general IVR module 220 sends the call to a general call queue 212. Priority call queue 210 forwards calls to priority call center 58. General call queue 212 forwards calls to the general call center 58. The call centers proceed to process the received calls.

Figure 3:
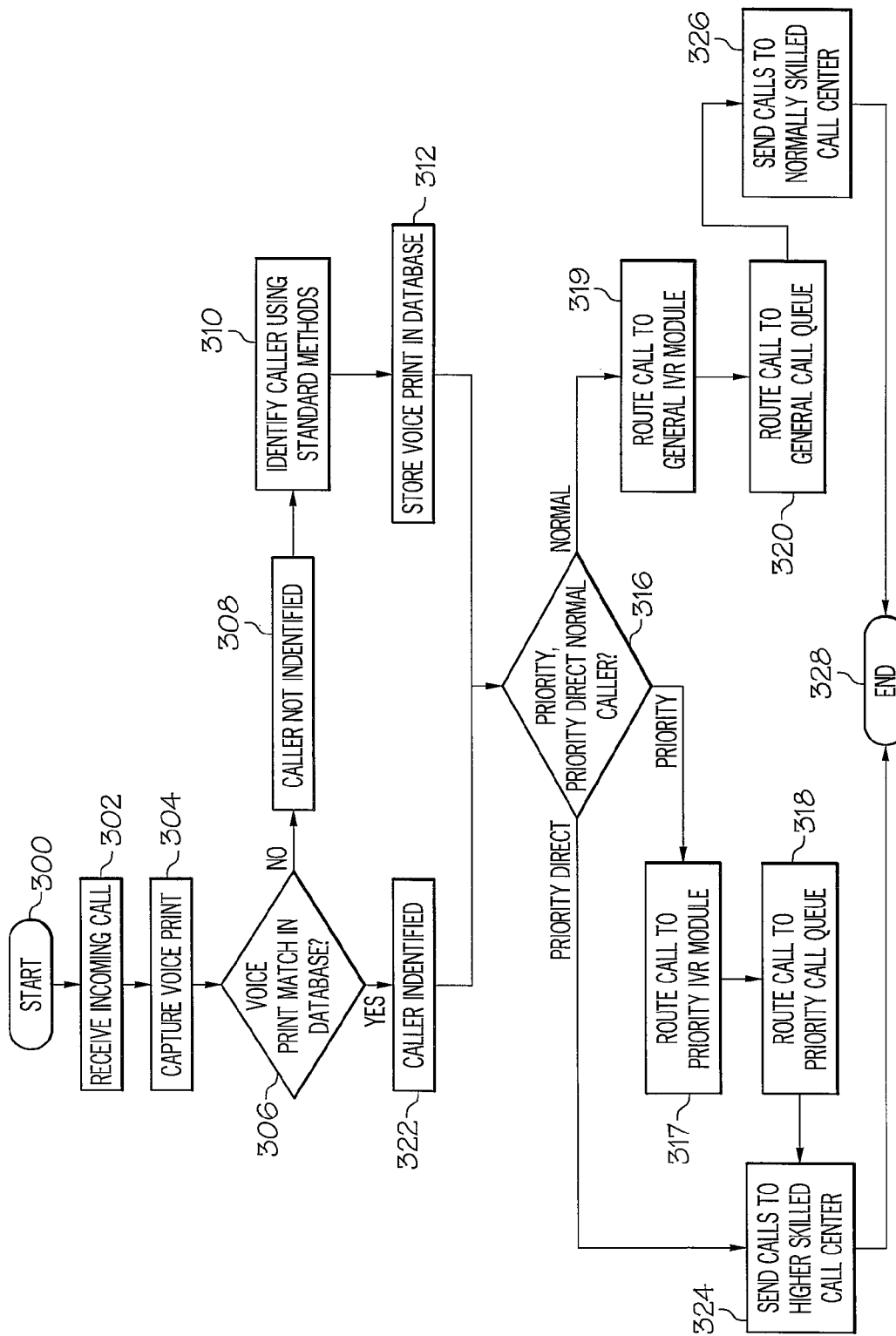
FIG. 3 is a high-level logical flowchart illustrating an exemplary method for implementing voice-print based priority call routing according to an embodiment of the present invention.

FIG. 3 is a high-level logical flowchart depicts an exemplary method for implementing voice-print based priority call routing according to an embodiment of the present invention. The process begins at step 300, and continues to step 302, which illustrates routing engine 216 (FIG. 2) receiving an incoming call from a client 54a-54n (FIG. 1A). The process proceeds to step 304, which depicts routing engine 216 capturing a voice print of the incoming call. The process continues to step 306, which shows routing engine 216 determining if the voice print of the incoming call matches any voice print within voice print database 214 (FIG. 2).

If the voice print of the incoming call does not match at least one voice print within voice print database 214, the process continues to step 308, which illustrates routing engine 216 determining that the caller of the incoming call has not been identified. The process continues to step 310, which illustrates routing engine 216 identifying the caller in the incoming call utilizing standard methods including, but not limited to: requiring the caller to enter or say an account number, a member number, a social security number (for U.S. residents), and the like. The process continues to step 312, which shows routing engine 216 storing the voice print of the caller into voice print database 214. The process continues to step 316.

Returning to step 306, if the voice print of the incoming call does not match at least one voice print within voice print database 214, the process continues to step 322, which illustrates routing engine 216 identifying the caller of the incoming call. The process continues to step 316, which illustrates routing engine 216 accessing the entry in voice print database 214 corresponding to the matching voice print and determining if the caller is a "priority", "priority direct", or "general" caller.

If the caller is a "priority direct" caller, the process continues to step 324, which illustrates routing engine 216 sending the incoming call directly to priority call center 58 via path 222.

If the caller is a "priority" caller, the process continues to step 317, which depicts routing engine 316 routing the call to a priority IVR module 218 for priority IVR treatment. As previously discussed, priority IVR module 218 enables a computer (e.g., call center server 52) to detect voice and/or touch tone input in a telephone call. After retrieving the data from the priority UVR treatment in step 317, the process continues to step 318, which shows priority IVR module 217 sending the call to priority call queue 210. As the call comes out of the end of priority call queue 210, the call is forwarded to the higher skilled call center (e.g., priority call center 58) for handling, as illustrated in step 324. The process ends, as depicted in step 328.

If the caller in the incoming call is a normal caller, the process continues to step 320, which illustrates routing engine 216 routing the incoming call general IVR module 220 for general IVR treatment. Then, as illustrated in step 320, general IVR module 220 routes the incoming call to general call queue 212. As the call comes out of the end of general call queue 212, the call is forwarded to the normally skilled call center (e.g., general call center 60), as depicted in step 326. The process ends, as shown in step 328.

The present invention includes a system, method, and computer-usable medium for routing a call. A server receives a call from a client. A routing engine captures a voice print from the call. In response to the routing engine capturing the voice print from the call, the routing engine compares the voice print to a database that includes a collection of voice prints. In response to the routing engine matching the voice print to at least one voice print among the collection of voice prints, an interactive voice response (IVR) module routes the call to an appropriate call queue based on the matching of the voice print. The appropriate queue routes the call from the appropriate call queue to a call center corresponding to the appropriate call queue.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to, random access memory (RAM), and communication media, such as computer networks and telephone networks, including Ethernet, the Internet, wireless networks, and like networks. It should be understood, therefore, that such signal-bearing media, when carrying or encoding computer-readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made herein without departing from the spirit and scope of the invention.

What is claimed is:

1. A method for routing a call, said method comprising:
    receiving, using a data processing system, a call from a caller;
    capturing, using the data processing system, a voice print of said caller;
    in response to capturing said voice print of said caller, comparing, using the data processing system, said voice print to a plurality of voice prints included in a database;
    in response to matching said voice print to at least one voice print among said plurality of voice prints, routing, using the data processing system, said call to an appropriate call queue based on said matching when said caller is not a priority direct caller, wherein said appropriate call queue is one of a priority call queue and a general call queue; and
    routing, using the data processing system, said call from said appropriate call queue to a call center corresponding to said appropriate call queue when said caller is not a priority direct caller, wherein when said caller is a priority direct caller said call is routed directly to a priority call center and is not routed to said appropriate call queue.

2. The method according to claim 1, further comprising:
    subjecting said call to an interactive voice response (IVR) treatment.

3. The method according to claim 1, further comprising:
    in response to not matching said voice print to at least one voice print among said plurality of voice prints, identifying said caller utilizing an identification number.

4. The method according to claim 1, further comprising:
    in response to matching said voice print to at least one voice print among said plurality of voice prints, sending said call directly to a priority call center.

5. A system for routing a call, said system comprising:
    a least one processor;
    a data bus coupled to said at least one processor; and
    a computer-usable storage device, coupled to said data bus, said computer-usable storage device embodying computer program code, said computer program code comprising instructions that when executed by said at least one processor configure said at least one processor for:
       receiving a call from a caller;
       capturing a voice print of said caller;
       in response to capturing said voice print of said caller, comparing said voice print to a plurality of voice prints included in a database;
       in response to matching said voice print to at least one voice print among said plurality of voice prints, routing said call to an appropriate call queue based on said matching when said caller is not a priority direct caller, wherein said appropriate call queue is one of a priority call queue and a general call queue; and
       routing said call from said appropriate call queue to a call center corresponding to said appropriate call queue when said caller is not a priority direct caller, wherein when said caller is a priority direct caller said call is routed directly to a priority call center and is not routed to said appropriate call queue.

6. The system according to claim 5, wherein said computer program code further comprises instructions executable by said at least one processor and configured for:
    subjecting said call to an interactive voice response (IVR) treatment.

7. The system according to claim 5, wherein said computer program code further comprises instructions executable by said at least one processor and configured for:
    in response to not matching said voice print to at least one voice print among said plurality of voice prints, identifying said caller utilizing an identification number.

8. The system according to claim 5, wherein said computer program code further comprises instructions executable by said at least one processor and configured for:
    in response to matching said voice print to at least one voice print among said plurality of voice prints, sending said call directly to a priority call center.

9. A computer usable storage device embodying computer program code, said computer program code comprising computer-executable instructions configured for:
    receiving a call from a caller;
    capturing a voice print of said caller;
    in response to capturing said voice print of said caller, comparing said voice print to a plurality of voice prints included in a database;
    in response to matching said voice print to at least one voice print among said plurality of voice prints, routing said call to an appropriate call queue based on said matching when said caller is not a priority direct caller, wherein said appropriate call queue is one of a priority call queue and a general call queue; and
    routing said call from said appropriate call queue to a call center corresponding to said appropriate call queue when said caller is not a priority direct caller, wherein when said caller is a priority direct caller said call is routed directly to a priority call center and is not routed to said appropriate call queue.

10. The computer usable storage device in claim 9, wherein said computer program code further comprises computer-executable instructions configured for:
    subjecting said call to an interactive voice response (IVR) treatment.

11. The computer usable storage device in claim 9, wherein said computer program code further comprises computer-executable instructions configured for:
    in response to not matching said voice print to at least one voice print among said plurality of voice prints, identifying said caller utilizing an identification number.

12. The computer usable storage device in claim 9, wherein said computer program code further comprises computer-executable instructions configured for:
    in response to matching said voice print to at least one voice print among said plurality of voice prints, sending said call directly to a priority call center.

* * * * *